United States Patent [19]
Larsson

[11] Patent Number: 4,667,538
[45] Date of Patent: May 26, 1987

[54] RANGE GEARBOX FOR MOTOR VEHICLES HAVING AN AXIALLY SHIFTABLE RING GEAR

[75] Inventor: Lena Larsson, Gothenburg, Sweden

[73] Assignee: AB Volvo, Gothenburg, Sweden

[21] Appl. No.: 676,411

[22] Filed: Nov. 28, 1984

[30] Foreign Application Priority Data

Dec. 6, 1983 [SE] Sweden .................................. 8306735

[51] Int. Cl.$^4$ .......................... F16H 3/44; F16H 57/10
[52] U.S. Cl. .......................................... 74/785; 74/740
[58] Field of Search .......................... 74/785, 788, 740

[56] References Cited

U.S. PATENT DOCUMENTS

| | | | |
|---|---|---|---|
| 2,248,133 | 7/1941 | Snar | 74/740 |
| 2,331,684 | 10/1943 | Henningsen | 74/291 |
| 2,593,629 | 4/1952 | Swift | 74/740 |
| 2,853,890 | 9/1958 | Kelbel | 74/740 X |
| 3,396,610 | 8/1968 | Rich, Jr. et al. | 74/740 |
| 4,063,470 | 12/1977 | Kelbel | 74/785 |
| 4,347,762 | 9/1982 | Holdeman | 74/788 |

FOREIGN PATENT DOCUMENTS

| | | | |
|---|---|---|---|
| 2622493 | 11/1977 | Fed. Rep. of Germany . | |
| 401481 | 5/1978 | Sweden . | |
| 2102575 | 2/1983 | United Kingdom | 74/785 |

Primary Examiner—Allan D. Herrmann
Assistant Examiner—Dirk Wright
Attorney, Agent, or Firm—Young & Thompson

[57] ABSTRACT

A range gearbox of planetary type designed to be joined to a vehicle gearbox, a so-called basic gearbox. The ring gear of the planetary gear set is non-rotatably jointed to an engaging sleeve by which the ring gear can be locked to an engaging ring fixed to the rear end wall of the gearbox, or to an engaging ring joined to the planetary gear carrier. The engaging sleeve serves as a ring gear carrier displacing the ring gear axially when shifting range modes.

7 Claims, 1 Drawing Figure

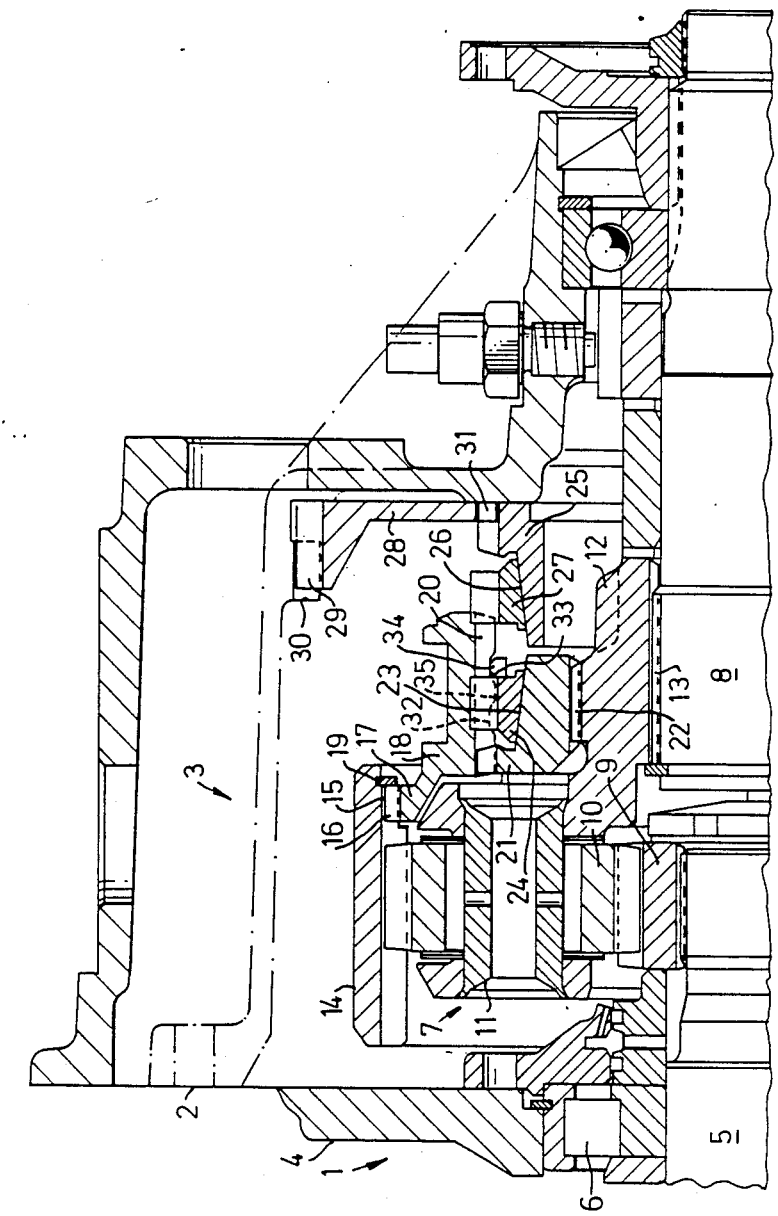

RANGE GEARBOX FOR MOTOR VEHICLES HAVING AN AXIALLY SHIFTABLE RING GEAR

The present invention relates to a range gearbox for motor vehicles, to be joined to the output side of a main gearbox and comprising a planetary gear set with a sun gear mounted on an input shaft and engaging planetary gears, which are carried on a planetary gear carrier joined to an output shaft and which engage a ring gear which can be locked by engaging means either against rotation relative to said housing to establish reduction ratio drive between the input shaft and the output shaft, or against rotation relative to the input and output shafts to establish direct drive between the shafts.

Vehicle transmissions consisting of a basic gearbox and a range gearbox joined to the output side thereof are quite common particularly in heavy trucks, to provide a large number of gear ratios and make it possible to operate the engine at a favourable rpm under varying loads and speeds. A four-speed basic gearbox and a two-speed range gearbox thus provide a total of eight gear ratios.

In a range gearbox of the type described in the introduction, in a known design the ring gear is joined to a ring gear carrier, which is rotatably mounted on the output shaft. To engage the lower speed range, an engaging sleeve which is axially displaceable but non-rotatable in relation to the ring gear carrier, is slid into engagement with an engaging ring, which is fixed to an intermediate wall which is rigidly joined to the range gearbox housing. Engagement of the higher range, i.e. direct drive, is accomplished by bringing the engaging sleeve into engagement with an engaging ring which is fixed to the output shaft.

This gearbox contains a number of components which must be dimensioned with regard to the high load on the planetary gear due to the so-called twisted torque between the planetary gear carrier and the ring gear when operating in the higher range mode. The twisted torque is transmitted via the planetary gear carrier, the output shaft, the engaging ring, the engaging sleeve and the ring gear carrier back to the ring gear. Due to the fact that so many components must be dimensioned for heavy loads, the range gearbox will be relatively expensive. Its axial space requirements are also great.

In another known range gearbox, the ring gear itself is used as the engaging sleeve. The ring gear is axially displaceable into engagement with engaging rings in front of and behind the planetary gear. While it is true that this design eliminates some of the components in the gearbox described above, several disadvantages are created, however. In the first place, the planetary gear set must be placed farther back than in the above described design in order to make room for a synchronizing engaging ring in front of the planetary gear set, which means that the "overhang" will be greater, i.e. the length of the main shaft (input shaft) between the bearing on the input side and the inner shaft end with the sun gear. Since the planetary gear set serves as an inner bearing point for the output shaft, it is desirable to keep the overhang as small as possible, since bending of the main shaft will displace the planetary gear set from its ideal position. These displacements increase with increasing overhang and can cause skewing of the gears resulting in poor tooth engagement. Secondly, the engaging rings and synchronizing devices must be adapted to the diameter of the ring gear, which means, for example, that they will be so large in diameter that it will not be possible to use the same components as in the basic gearbox.

The purpose of the present invention is to achieve a range gearbox of the type described by way of introduction, which can be constructed using fewer components, and in particular fewer components subjected to twisted torque, than in the first mentioned known range gearbox, while at the same time maintaining minimal overhang and the possibility of using standard components for the synchronization.

This is accomplished according to the invention by the ring-gear being non-rotatably coupled to an engaging sleeve serving as a ring gear carrier and mounted concentrically to the output shaft, said engaging sleeve being axially displaceable between a first engagement position in which it establishes a non-rotatable coupling between the ring gear and the output shaft, and a second engagement position, in which it establishes a non-rotatable coupling between the ring gear and the housing.

In the embodiment according to the invention the engaging ring for the high range can be rigidly joined to the hub of the planetary gear carrier, which means that the twisted torque will be transmitted from the planetary gear carrier to the ring gear only via the engaging ring and the engaging sleeve. The engaging ring for the low range can be securely joined to the rear end wall of the housing, thus eliminating the need for the previously mentioned intermediate wall. This, together with the absence of, on the one hand, a ring gear carrier rotatably mounted on the output shaft and, on the other hand, an engaging ring securely joined to the output shaft, provides a gearbox of optimum shortness in the axial direction. The design makes it possible to use an engaging sleeve with a smaller diameter than the ring gear, with the direct result being that the shifting fork, the synchronizing cones and the engaging rings will be smaller and less expensive than in the known design, where the ring gear itself is used as an engaging sleeve.

The invention will be described in more detail below with reference to an example shown in the accompanying drawing. The FIGURE shows a longitudinal section through the upper half of a range gearbox joined to a basic gearbox.

In the Figure, 1 designates the rear portion of the housing of a basic gearbox to which there is securely bolted a flange 2 on the forwardly open housing 3 of a range gearbox. The rear wall 4 of the housing 1 thus forms the front end wall of the range gearbox 3. The basic gearbox has an output shaft 5 which is mounted in a bearing 6, and extends into the housing 3 of the range gearbox. The shaft 5 forms the input shaft of the range gearbox, which is coupled via a planetary gear set, generally designated 7, to an output shaft 8 provided with a flange for connection to the vehicle propeller shaft.

The planetary gear set 7 comprises a sun gear 9 securely joined to the input shaft 5. The sun gear 9 engages planetary gears 10, which are mounted on shafts 11 carried by a planetary gear carrier 12, which is, in turn, non-rotatably mounted via splines 13 on the output shaft 8. The planetary gears 10 engage a ring gear 14, which has internal splines 15 in engagement with external splines 16 on an annular flange 17 which is made in one piece with an engaging sleeve 18. A lock ring 19 in a groove in the ring gear fixes these parts axially. The sleeve 18 is axially displaceable with the aid of a shifting fork (not shown) coupled to the vehicle shift mechanism.

The engaging sleeve 18 has internal teeth 20, which in the position shown in the Figure, engage corresponding teeth on an engaging ring 21, which is non-rotatably joined by means of splines 22 to the hub of the planetary gear carrier. The engaging ring 21 is made with a synchronizing cone 23 which carries a synchronizing ring 24 in engagement with the teeth 20 of the engaging sleeve 18. A corresponding toothed engaging ring 25 with a synchronizing cone 26 carrying a synchronizing ring 27 is securely fixed to the rear end wall of the range gearbox housing 3 by an annular plate 28, having external teeth 29 which engage teeth 30 formed on the inside of the housing 3 and having internal teeth 31 which engage the teeth of the engaging ring 25.

The teeth 20 of the engaging sleeve 18 have recesses 32 and 33, intended to hold an annular spring 34 which is mounted between the synchronizing rings 24 and 27. The function of this spring 34 is to transmit the engaging force from the sleeve 18 to the synchronizing rings during shifting. The recesses 32 and 33 thus form in principle a pair of annular grooves between which the spring 34 is moved when shifting gear range, the spring being compressed during the shifting movement by the ridge 35 formed between the recesses or grooves.

In the position of the engaging sleeve 18 shown in the Figure, the ring gear 14 is locked against rotation relative to the planetary gear carrier 12 by the teeth of the engaging sleeve 18 engaging the teeth of the engaging ring 21. The planetary gear set is thus locked, establishing direct drive between the input shaft and the output shaft. When the engaging sleeve 18, and with it the ring gear 14, are displaced to the right in the Figure, the sleeve 18 is first released from the teeth of the engaging ring 21. After being displaced a certain distance, the ring spring 34 strikes the opposite synchronizing ring 27 and presses it against the cone 26 of the engaging ring 25, initiating the braking of the engaging sleeve and the ring gear. During the continued displacement of the sleeve 18, the spring 34 is compressed by the interaction of the inclined edge surfaces of the groove 33 and the spring 34 and is finally displaced over the ridge 35 to the groove 32. In this position, the synchronizing operation is complete and the engaging sleeve can be brought into engagement with the engaging ring 25 to lock the ring gear 14 to the housing.

What is claimed is:

1. Range gearbox for motor vehicles, intended to be joined to the output side of a main gearbox and comprising a planetary gear set with a sun gear mounted on an input shaft and engaging planetary gears, which are carried on a planetary gear carrier joined to an output shaft and which engage a ring gear which can be locked by engaging means either against rotation relative to said housing to establish reduction ration drive between the input shaft and the output shaft or against rotation relative to the input and output shafts to establish direct drive between the shafts, characterized in that the ring gear is non-rotatably and axially fixedly coupled to an engaging sleeve serving as a ring gear carrier that shifts the ring gear axially, said engaging sleeve being mounted concentrically to the output shaft, said engaging sleeve being axially displaceable with the ring gear and relative to the planetary gear carrier between a first engagement position in which it establishes a non-rotatable coupling between the ring gear and the output shaft, and a second engagement position, in which it establishes a non-rotatable coupling between the ring gear and the housing.

2. Range gearbox according to claim 1, characterized in that the engaging sleeve in one engagement position engages a first engaging ring fixed in relation to the planetary gear carrier and in the other engagement position engages a second engaging ring fixed in relation to the housing.

3. Range gearbox according to claim 2, characterized in that the engaging rings are made with synchronizing cones directed towards each other, and each cooperating with an individual synchronizing ring which engages the engaging sleeve.

4. Range gearbox according to claim 3, characterized in that each of the synchronizing rings can be pressed against its respective synchronizing cone with the aid of a ring spring arranged between the cones, said ring spring in one engagement position being placed in a first internal ring groove in the engaging sleeve and, upon displacement of the engaging sleeve to the second engagement position, is shifted over to a second internal groove in the sleeve by the synchronizing ring active in the second position.

5. Range gearbox according to claim 1, characterized in that the engaging sleeve has an annular flange with external splines which engage internal splines in the ring gear, and that the engaging sleeve is fixed axially relative to the ring gear by means of a lock ring mounted in a groove in the ring gear.

6. Range gearbox according to claim 1, characterized in that the engaging sleeve extends within and carries the ring gear by engagement with inner surfaces of the ring gear.

7. Range gearbox according to claim 6, characterized in that the engaging sleeve is of smaller diameter than the ring gear.

* * * * *